Aug. 11, 1942.     B. J. HOUGEN     2,292,640

HAY LOADER

Filed March 15, 1940

INVENTOR:
BYRON J. HOUGEN
BY
ATTORNEYS.

Patented Aug. 11, 1942

2,292,640

UNITED STATES PATENT OFFICE 2,292,640

HAY LOADER

Byron J. Hougen, Ottumwa, Iowa, assignor to Dain Manufacturing Company of Iowa, Ottumwa, Iowa, a corporation of Iowa Application March 15, 1940, Serial No. 324,124

3 Claims. (Cl. 280—85)

The present invention relates to agricultural implements and is more directly concerned with that type of implement known as hay loaders.

The principal object of the present invention is to provide a new and improved tongue truck for hay loaders and implements of like nature, which is strongly braced against fore and aft deflection and which can be manufactured at low cost.

Other objects and advantages of the present invention will become apparent after consideration of the following detailed description of the preferred embodiment thereof, reference being had to the accompanying drawing, in which Figure 1 is a side elevational view of a double cylinder hay loader constructed according to the principles of my invention;

Figure 1:
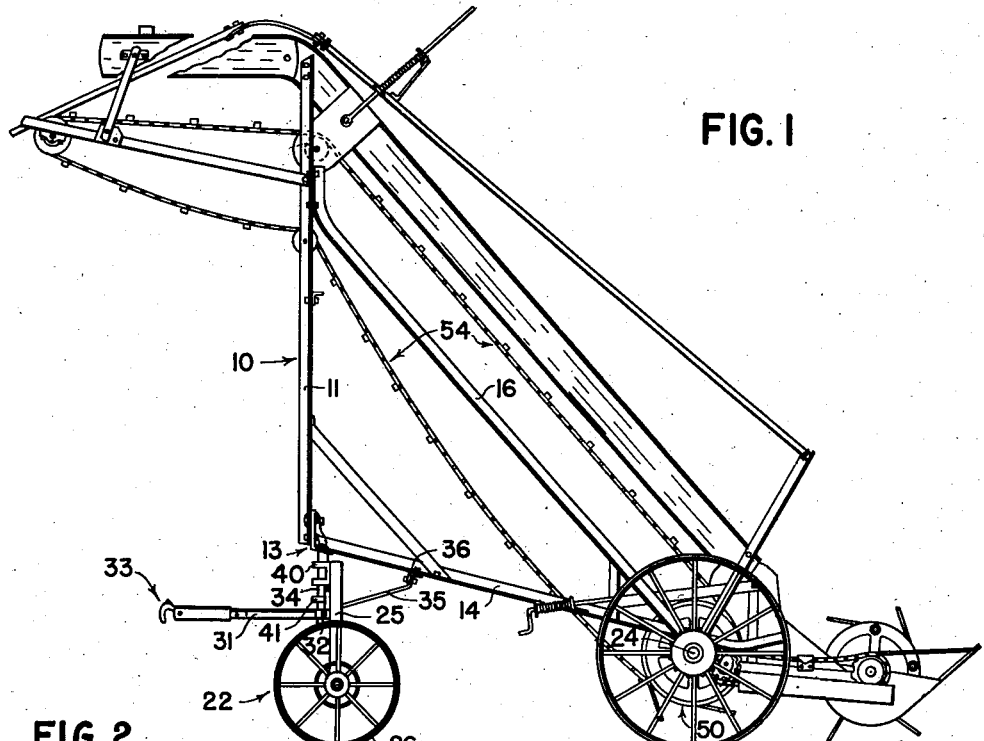
Figure 2:
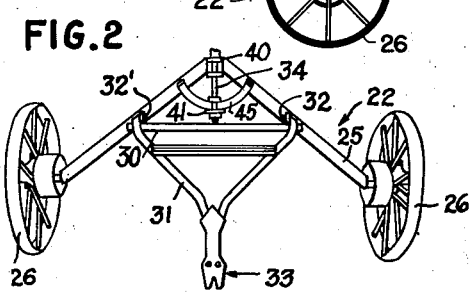
Figure 2 is an enlarged front perspective view of the tongue truck.
Figure 3:
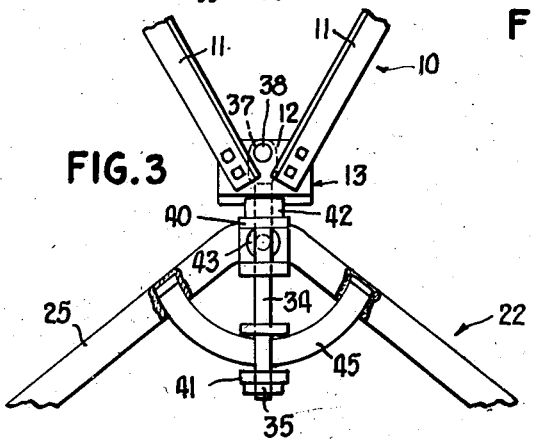
Figure 3 is an enlarged front detail view of the connection between the tongue truck and the main frame.
Figure 4:
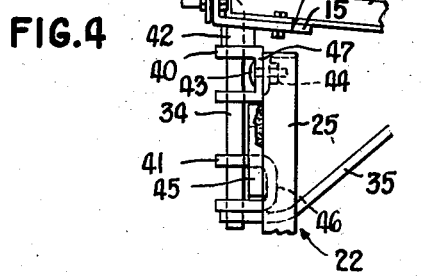
Figure 4 is a side elevation of the structure shown in Figure 3.

Referring now to the drawing, the hay loader includes a main frame indicated generally by the reference numeral 10 and comprising a pair of vertically disposed bars 11 secured at their lower ends to the vertical flange 12 of an angle bracket or gusset plate 13 and diverging upwardly laterally therefrom (Figure 5). A pair of side members 14 are fixed at their front ends to the horizontal flange 15 of the angle bracket 13 and extend rearwardly therefrom in diverging relation, while a second pair of side members 16 are fixed to the upper portions of the frame bars 11 and extend rearwardly and downwardly therefrom and are joined to the rear ends of the side members 14.

The main frame 10 of the hay loader is supported at its front end on a tongue truck 22 and at its rear end on a pair of laterally spaced ground wheels 23 mounted on the outer ends of a transversely disposed axle 24 journaled in suitable bearings on the frame. The tongue truck 22 comprises an inverted V-shaped axle or frame 25 normally disposed transverse to the line of forward travel and having laterally spaced wheels 26 journaled on the outer ends thereof. The arms of the V-shaped axle are cross-connected by a bracing member 30 to prevent them from spreading under excessive loads. A forked tongue 31 is pivoted at 32, 32' on the axle 25 and extends forwardly therefrom, the front end of the tongue being provided with a suitable coupling device 33 for hitching the hay loader to a wagon or other vehicle.

The tongue truck 22 is connected with the main frame 10 for lateral tilting about a longitudinal axis, and for turning about a vertical axis by means comprising a vertically disposed pivot pin 34 which extends upwardly through a suitable hole in the horizontal flange 15 of the bracket 13. The upper end of the pin 34 is flattened at 37 and is bent forward slightly to lie flat against the back of the vertical bracket flange 12. A fastening bolt 38 extending through aligned holes in the flange 12 and flattened portion of the pin 34 serves to secure the upper end of the pin rigidly to bracket 13. A bracing member 35 is fixed to the lower end of the pin 34 and extends upwardly and rearwardly therefrom to connect with a cross bar 36 which is bolted to the frame members 14. The purpose of the bracing member 35 is to hold the pin 34 rigid with respect to the frame 10 and to resist longitudinally directed thrust forces which would otherwise tend to bend the pin. Journaled on the pin 34 are a pair of vertically spaced bracket members 40 and 41 which are preferably formed of strap or bar stock bent into the shape of a U and having aligned journal holes in the arm portions thereof to receive the pin. The upper bracket 40 is disposed to bear against a thrust bearing block 42 embracing the pin 34 and seating against the bottom of the bracket flange 15. A longitudinally extending pivot bolt 43 extends through aligned holes in the bight 47 of the top bracket 40 and in the apex of the V-shaped axle 25 and is secured by a nut 44. A curved guide bar 45 is welded or otherwise fixed to the axle 25 so that the center of curvature of the bar coincides with the axis of the pivot bolt 43. The bar 45 is slidably disposed within the space between the bight 46 of the lower bracket 41 and the pin 34 and constitutes a sliding brace connection between the pin 34 and the tongue truck 22, allowing the latter to pivot freely about the vertical axis of the pin 34 and the longitudinal axis of the pivot bolt 43 but preventing relative fore and aft oscillatory movement between the tongue truck and the main frame 10.

Mounted on the rear axle 24 to rotate therewith is an elevating cylinder 50 which picks up the loose hay lying on the ground and deposits it on a forwardly and upwardly inclined conveyor 54 whence it is elevated and discharged upon an accompanying wagon.

It is believed that the advantageous features of my invention will be evident from the foregoing description, and what I claim and desire to secure by Letters Patent is:

1. In an implement of the class described having a main frame, a vertically disposed pivot pin rigidly fixed to said frame, a pair of vertically spaced bracket members journaled on said pin for rotation about the axis thereof, a tongue truck pivotally connected with one of said bracket members for tilting about a longitudinal axis, and means on said tongue truck slidably engaging the other of said bracket members for bracing the tongue truck in a fore and aft direction.

2. In an implement of the class described having a main frame, a vertically disposed pin fixed at its upper and lower ends to said frame, a U-shaped bracket member having aligned journaled holes in the legs thereof adapted to receive the pin, a U-shaped slide member having aligned journal holes in the legs thereof adapted to receive the pin, a tongue truck pivotally connected with the bight portion of said bracket member for tilting about a longitudinal axis, and a curved guide bar fixed to said tongue truck with its center at said longitudinal axis and slidably disposed between said pin and the bight portion of said slide member.

3. In an implement of the class described having a frame, a vertically disposed pin fixed to said frame, a tongue truck comprising an inverted V-shaped axle having wheels journaled at the outer ends thereof, a bracket member journaled on said pin and pivoted to the apex of said axle for rotation about a longitudinal axis, a curved guide bar fixed to the arms of said axle and describing an arc about the apex, and a slide member journaled on said pin and slidably engaging said bar for bracing the truck in a fore and aft direction.

BYRON J. HOUGEN